(12) United States Patent
Tracht

(10) Patent No.: US 7,322,597 B2
(45) Date of Patent: Jan. 29, 2008

(54) VEHICLE SEAT ASSEMBLY WITH SEPARABLE AIR BAG GUIDE RETAINERS

(75) Inventor: Michael L. Tracht, Ingolstadt (DE)

(73) Assignee: Lear Corporation, Southfield, MI (US)

( * ) Notice: Subject to any disclaimer, the term of this patent is extended or adjusted under 35 U.S.C. 154(b) by 443 days.

(21) Appl. No.: 10/904,836

(22) Filed: Dec. 1, 2004

(65) Prior Publication Data

US 2006/0113752 A1 Jun. 1, 2006

(51) Int. Cl.
*B60R 21/20* (2006.01)

(52) U.S. Cl. .................. 280/728.3; 280/730.2

(58) Field of Classification Search ............ 280/730.2, 280/728.3, 728.2, 743.1; 297/218.2, 218.3
See application file for complete search history.

(56) References Cited

U.S. PATENT DOCUMENTS

| | | | |
|---|---|---|---|
| 5,498,030 A | 3/1996 | Hill et al. | |
| 5,667,242 A | 9/1997 | Slack et al. | |
| 5,749,597 A | 5/1998 | Saderholm | |
| 5,762,363 A | 6/1998 | Brown et al. | |
| 5,799,970 A * | 9/1998 | Enders ................... | 280/730.2 |
| 5,799,971 A | 9/1998 | Asada | |
| 5,810,389 A | 9/1998 | Yamaji et al. | |
| 5,816,610 A | 10/1998 | Higashiura et al. | |
| 5,860,673 A | 1/1999 | Hasegawa et al. | |
| 5,890,734 A | 4/1999 | Saderholm | |
| 5,893,579 A | 4/1999 | Kimura et al. | |
| 5,897,134 A | 4/1999 | Stein et al. | |
| 5,927,749 A | 7/1999 | Homier et al. | |
| 5,938,232 A * | 8/1999 | Kalandek et al. ........ | 280/730.2 |
| 5,967,546 A | 10/1999 | Homier et al. | |
| 6,007,091 A | 12/1999 | Westrich | |
| 6,045,151 A * | 4/2000 | Wu ....................... | 280/728.3 |
| 6,179,324 B1 | 1/2001 | White et al. | |
| 6,206,410 B1 | 3/2001 | Brown | |
| 6,237,934 B1 | 5/2001 | Harrell et al. | |
| 6,293,580 B1 | 9/2001 | Lachat et al. | |
| 6,352,304 B1 | 3/2002 | Sorgenfrei | |
| 6,386,577 B1 | 5/2002 | Kan et al. | |
| 6,450,528 B1 | 9/2002 | Suezawa et al. | |
| 6,457,741 B2 | 10/2002 | Seki et al. | |
| 6,588,838 B1 | 7/2003 | Dick, Jr. et al. | |
| 7,004,496 B2 | 2/2006 | Bossecker et al. | |
| 7,134,685 B2 | 11/2006 | Panagos et al. | |
| 2004/0195029 A1 | 10/2004 | Feldman | |
| 2006/0113752 A1 | 6/2006 | Tracht | |
| 2006/0113761 A1 | 6/2006 | Tracht | |

FOREIGN PATENT DOCUMENTS

| | | |
|---|---|---|
| DE | 103 07 480 A1 | 9/2004 |
| EP | 0 782 944 A | 7/1997 |
| FR | 2 806 685 A1 | 9/2001 |
| GB | 2 410 011 A | 7/2005 |
| WO | WO 00/06426 A1 | 2/2000 |

\* cited by examiner

*Primary Examiner*—Paul N. Dickson
*Assistant Examiner*—Tiffany L. Webb
(74) *Attorney, Agent, or Firm*—Brooks Kushman P.C.

(57) ABSTRACT

In at least certain embodiments, the vehicle seat assembly comprises a frame, a seat pad, a trim cover extending over the seat pad and including a first and second end portion forming a release seam adjacent the seat pad, and an air bag assembly within the trim cover. In accordance with this embodiment, the air bag assembly includes an inflator and an air bag inflatable to project outwardly from the seat through the air bag release seam of the trim cover. Further in accordance with this embodiment, the vehicle seat assembly further includes an air bag guide including an inner panel and an outer panel, a first connector connected to the first and second end portions of the trim cover, and a second connector connected to outer panels.

19 Claims, 3 Drawing Sheets

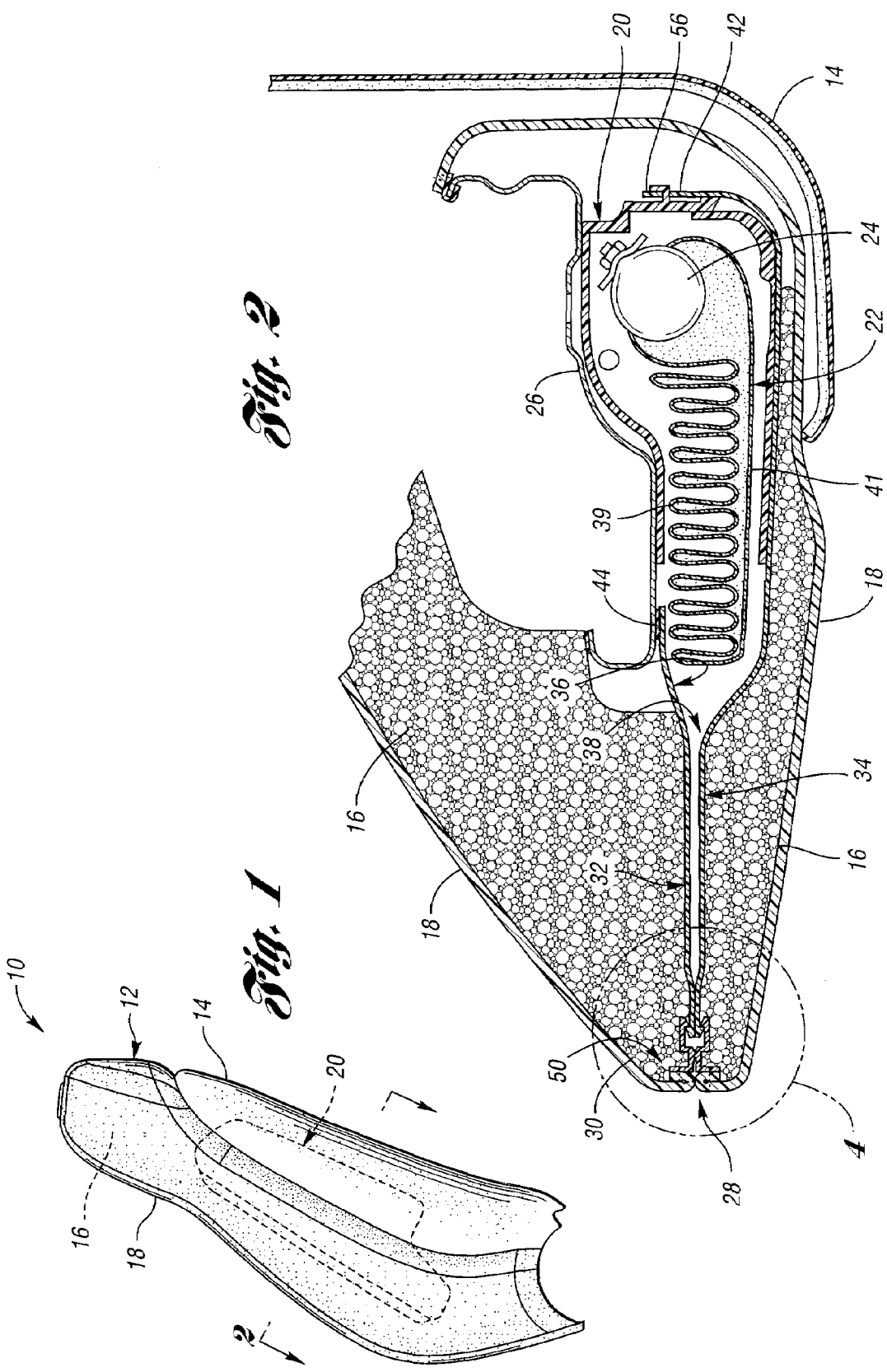

VEHICLE SEAT ASSEMBLY WITH SEPARABLE AIR BAG GUIDE RETAINERS

BACKGROUND OF THE INVENTION

1. Field of the Invention

The present invention relates to a vehicle seat assembly, and in particular, a seat assembly including an air bag.

2. Background Art

Vehicles can be equipped with side air bags, which may be in the form of a side air curtain disposed in a headliner of the vehicle, or alternatively, may be an air bag disposed within a vehicle seat assembly. One limitation of air bags that are located within a seat assembly, is that the air bag needs to break through the seating material before it can fully deploy to protect a vehicle occupant. During deployment, such an air bag may encounter foam, or other seat pad materials, and must then break through a seat trim cover in order to escape from the seat assembly. Another limitation is that the air bag should break through the cover material at a predetermined location to optimize effectiveness.

Prior vehicle seat assemblies equipped with side air bags and manufacturing methods are disclosed in U.S. Pat. Nos. 5,816,610, 5,860,673, 5,938,232, 6,045,151, 6,237,934 and 6,588,838, for example.

SUMMARY OF THE INVENTION

Under the invention, a vehicle seat assembly is provided. In at least one embodiment, the vehicle seat assembly comprises a frame, a seat pad adjacent the frame, and a trim cover extending over the seat pad and including a first and second end portion forming a release seam adjacent the seat pad, and an air bag assembly mounted on the frame within the trim cover in a spaced relationship from its air bag release seam. In accordance with this embodiment, the air bag assembly includes an inflator and a folded air bag that is inflated by the inflator to unfold and project outwardly from the seat through the air bag release seam of the trim cover. Further in accordance with this embodiment, the vehicle seat assembly further includes an air bag guide including an inner panel and an outer panel that are each made of flexible material and have outer extremities, a first connector connected to the first and second end portions of the trim cover, and a second connector connected to the flexible inner and outer panels.

In at least one embodiment, the second connector separates upon inflation of the air bag causing the separation of the first connector which causes the separation of the release seam.

In yet another embodiment, the first connector comprises a base portion comprising a first leg connected to the first end portion of the trim cover and a second leg connected to the second end portion of the trim cover.

In at least another embodiment, the first connector is a unitary member further comprising a retainer portion for connection with the second connector and a frangible portion extending between and connecting the base portion and the retainer portion.

In still yet at least another embodiment, the first connector is made of rigid plastic and the frangible portion separates upon inflation of the air bag.

In still yet at least another embodiment, the second connector is made of rigid plastic and the second connector comprises a unitary member comprising an inner portion, an outer portion, and a frangible portion extending between and connecting the inner and outer portions, each of the inner and outer portions of the second connector connecting to a respective one of the outer extremities of the flexible inner and outer panels.

In yet at least another embodiment, the vehicle seat assembly comprises a frame, a seat pad adjacent the frame, and a trim cover extending over the seat pad that includes a first and a second end portion forming a release seam adjacent the seat pad. In this embodiment, the seat assembly further comprises an air bag assembly within the trim cover in a spaced relationship from its air bag release seam, with the air bag assembly including an inflator and a folded air bag that is inflated by the inflator to unfold and project outwardly from the seat through the air bag release seam of the trim cover. In this embodiment, the seat assembly also further comprises an air bag guide including an inner panel and an outer panel having outer extremities, a first connector extending between and connecting the first and second end portions of the trim cover, and a second connector extending between and connecting the inner and outer panels to each other, with the second connector extending between the first connector and the inner and outer panels.

In still yet at least another embodiment, the vehicle seat assembly comprises a frame, a seat pad mounted on the frame, a trim cover extending over the seat pad and including a first end portion and a second end portion cooperating to form a release seam adjacent the seat pad, and an air bag assembly mounted on the frame within the trim, with the air bag assembly including an inflator and an air bag that is inflated by the inflator to project outwardly from the seat through the air bag release seam of the trim cover. In this embodiment, the seat assembly further comprises an air bag guide including a first panel and a second panel, with each panel having outer extremities. In this embodiment, the seat assembly still further comprises a first connector extending between and connecting the first and second end portions of the trim cover, with the first connector comprising a base portion comprising a first leg connected to the first end portion of the trim cover and a second leg connected to the second end portion of the trim cover, and a second connector extending between and connecting the first and second panels to each other, with the second connector extending between the first connector and the first and second panels, wherein the second connector separates upon inflation of the air bag causing the separation of the first connector which causes the separation of the release seam.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 1 is a fragmentary side view of a portion of a seat assembly in accordance with the present invention;

FIG. 2 is a fragmentary sectional view of the seat assembly shown in FIG. 1, taken through line 2-2;

DETAILED DESCRIPTION OF THE PREFERRED EMBODIMENT(S)

Figure 3:
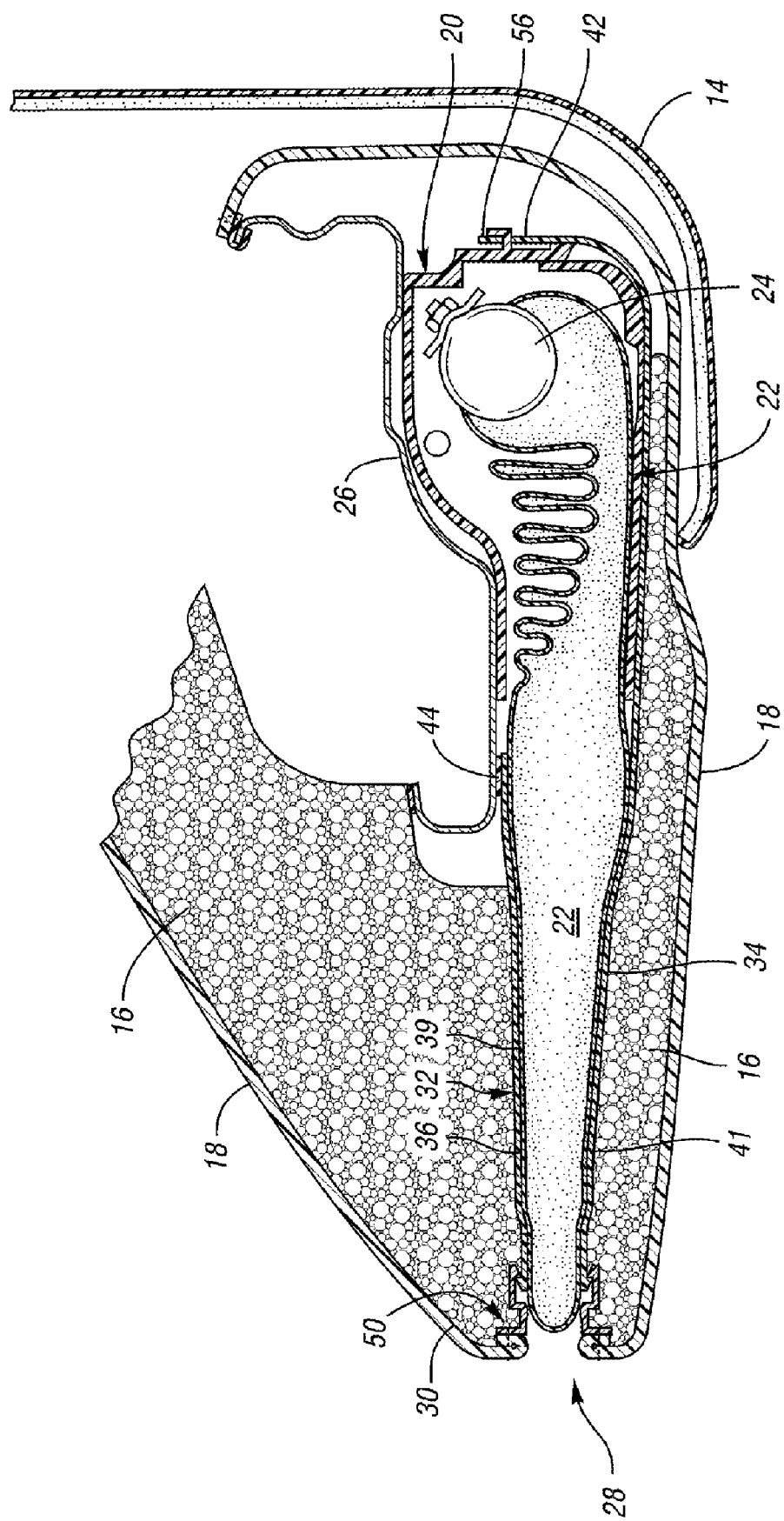
FIG. 3 is a view similar to FIG. 2 showing the parts in a different position.

As required, detailed embodiments of the present invention are disclosed herein. However, it is to be understood that the disclosed embodiments are merely exemplary of the invention that may be embodied in various alternative forms. The figures are not necessarily of scale, some features may be exaggerated or minimized to show details of particular components. Therefore specific structural and functional details disclosed herein are not to be interpreted as limiting, but merely as a representative basis for the claims and/or a representative basis for teaching one skilled in the art to variously employ the present invention.

Moreover, except where otherwise expressly indicated, all numerical quantities in this description and in the claims indicating amounts of materials or conditions of reactions and/or use are to be understood as modified by the word "about" in describing the broader scope of this invention. Practice within the numerical limits stated is generally preferred. Also, unless expressly stated to the contrary, the description of a group or class of materials as suitable preferred for a given purpose in connection with the invention implies that mixtures of any two or more members of the group or class may be equally suitable or preferred.

FIG. 1 shows a portion of a seat assembly 10 in accordance with the present invention. The seat assembly 10 includes a seat back 12, and seat pad 16 covered by a trim cover 18. As is well known, the seat assembly 16 includes a seat bottom (not shown). The trim cover 18 may be made of any suitable material such as cloth, vinyl or leather, etc. As is shown in FIG. 1, in at least some embodiments, a relatively rigid plastic molding 14 can be provided in the rear area of the seat assembly 10 to provide support and/or for aesthetics.

In at least one embodiment, the seat pad 16 is made from a molded polymeric material, such as a polyurethane foam. The use of a polymeric foam material to construct the seat pad 16 can be cost effective and can provide the flexibility needed to easily change the shape of the seat pad for different types of seat assemblies. Of course, other types of polymeric materials may be molded to form the seat pad 16.

Disposed within the seat back 12 is an air bag assembly, such as a side air bag assembly 20. While the side air bag assembly 20 is shown on the seat back 12, which is a usage for which it has particular utility, it is also possible for the side air bag assembly to be utilized with a seat bottom even though the seat back usage is specifically disclosed. Also, as illustrated, the air bag assembly 20 is located at an outboard lateral side or extremity of the seat to provide protection against adjacent vehicle structure, but it is also possible to have the side air bag assembly located at the inboard lateral side to provide protection against an adjacent vehicle occupant and to also have side air bag assemblies at both outboard and inboard locations for protection in both lateral directions.

As shown in FIG. 2, the air bag assembly 20 includes an air bag 22 and an inflator 24, which is configured to supply inflation fluid such as gas to the air bag 22, thereby facilitating deployment of the air bag 22. In at least one embodiment, the air bag assembly 20 also includes a housing 40 which at least partially surrounds the air bag 22 and the inflator 24.

Also shown in FIG. 2 is a portion of a seat frame 26 which can be used for mounting the seat assembly 10 to a vehicle. The seat pad 16 is disposed proximate the frame 26 and air bag assembly 20 and may be directly attached to the frame 26 at various points. The trim cover 18 includes an air bag release seam 28 which in at least one embodiment is adjacent to a side 30 of the seat pad 16. In the embodiment shown in FIG. 4, the trim cover 18 includes end portions 31, 33 that cooperate to form seam 28.

The air bag assembly 20 is located within the trim cover 18 and may be conventionally mounted, such as on the frame 26, adjacent the air bag release seam 28 but in a spaced relationship from the release seam. The schematically illustrated folded air bag 22, upon deployment, is inflated by inflation fluid from the inflator 24 to unfold and project outwardly from the seat 10 through the air bag release seam 28 of the trim cover 18 (FIG. 3).

With continuing reference to FIG. 2, an air bag guide of the seat back component is generally indicated by 32 and includes an inner panel 34 and an outer panel 36 that are each made of any suitable material effective to protect the seat pad 16 during deployment of the air bag 22. As used herein, the term "inner" refers to the side closer to the driver's side door, and the term "outer" refers to the side closer to the passenger side door. For example, a woven or non-woven cloth material, which may include natural or synthetic materials such as nylon. One material that is found to be effective is a polyester material, of the type from which the air bag 22 may be manufactured. Regardless of the type of material used to make the air bag guide 32, the use of the air bag guide 32 can be helpful in reducing friction on the air bag 22 as it deploys. Although a polymer such as nylon may be particularly beneficial, even a fleece material will help reduce the friction on the air bag 22. This is because the air bag guide 32 inhibits contact between the deploying air bag 22 and the seat pad 16 and helps to prevent small particles from separating from the seat pad and being introduced into the vehicle compartment.

The inner and outer panels 34, 36 of the air bag guide 32 respectively include inner extremities 42,44 that can be attached suitably to the housing 40 and/or frame 26 to effectively associate the air bag guide 32 with the housing 40 of the air bag assembly 20. As shown in the embodiment illustrated in FIG. 2, the inner extremity 44 of the outer panel 36 is connected with the frame 26 and the inner extremity 42 of the inner panel 34 is connected with the housing 40 at 56.

Figure 4:
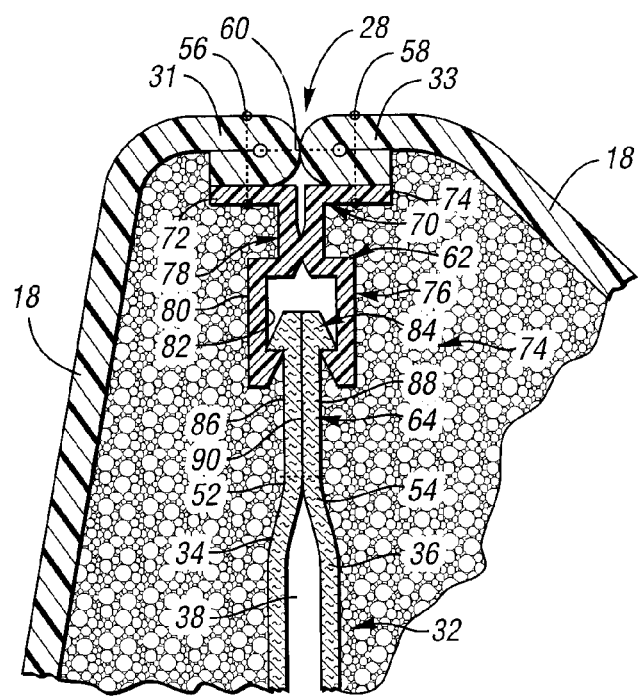
FIG. 4 is a fragmentary sectional view of a detail of the seat assembly shown in FIG. 2.

As shown in FIG. 4, the inner and outer panels 34, 36 of the air bag guide 32 respectively include outer extremities 52, 54 attached to opposed ends of a retainer assembly 50 adjacent the seam 28. The retainer assembly 50 is also attached to the trim cover 18 adjacent the seam 28. In at least the embodiment shown in FIG. 4, the retainer assembly 50 comprises an outer retainer 62 connected to the end portions 31, 33 of the trim cover 18 in any suitable manner. For instance, the outer retainer 62 could be connected to the cover 18 by stitching, i.e., by being sewn, as shown, or by other conventional means such as ultrasonic welding and adhesives. In this embodiment, the retainer assembly 50 also comprises an inner retainer 64 connected to the guide 32 in any suitable manner. The inner retainer 64 is insertable into, and engagable with, the outer retainer 62. The inner and outer retainers 64, 62 can be independently made of any suitable relatively rigid material such as a rigid plastic such as nylon, PP (polypropylene), PE (polyethylene), and can be made by any suitable process such as injection molding.

In the embodiment shown in FIG. 4, the outer extremities 52, 54 of inner and outer panels 34, 36 can be attached to the inner retainer 64 in any suitable manner. For instance, the outer extremities 52, 54 can be attached to the inner retainer 64 via stitching, ultrasonic welding, adhesive, etc., among other suitable manners. Also, in one embodiment, the inner retainer 64 could be secured to the outer extremities 52, 54 of the air bag guide 32 via in situ molding of a polymeric seat pad 16. In this embodiment, the retainer assembly 50, already attached to the trim cover 18, and the guide 32 would both be suitably placed in the polymeric, such as polyurethane, mold so that the polymeric material used to form pad 16 could form around and secure the guide 32 to the inner retainer 64 of the retainer assembly 50. In at least this embodiment, the inner and outer panels 34 and 36 could have small openings, such as holes, that can allow relatively small amounts of polymeric material to extend between the panels. These relatively small amounts would not hinder deployment of the air bag 22.

In at least one embodiment, as shown in FIG. 4, the outer retainer 62 of the retainer assembly 50 is a unitary member having a base portion 70 comprising a first leg 72 and a second leg 74, a retainer portion 76, and a frangible portion 78 extending between and connecting the base and retainer portions 70 and 76.

As shown in the embodiment illustrated in FIG. 4, the first leg 72 of the outer retainer 62 is connected to the first end portion 31 of the trim cover 18 and the second leg 74 is connected to the second end portion 33 of the trim cover 18. The legs 72 and 74, as shown in the embodiment illustrated in FIG. 4, are separated by a groove, or space. In other embodiments, other separation means such as a perforation, or a frangible portion can be provided between 72 and 74 in lieu of a continuous space. In the illustrated embodiment, the retainer portion 76 of the outer retainer 62 includes walls 80 that form a housing 82 which an engagement portion 84 of the inner retainer 64 is received within.

The inner retainer 64 includes a first arm portion 86, a second arm portion 88, and a frangible portion 90 extending therebetween. The first and second arm portions 86 and 88 each include a nose portion forming the engagement portion 84 and have end portions attached to a respective panel 34, 36 as shown in FIG. 4. The engagement portion 84 is insertable within housing 82 to engage inner retainer 64 with outer retainer 62.

The frangible portions 78 and 90 of the retainers 62 and 64 can be any suitable section formed to break or rupture first on their respective retainer 62, 64. For instance, the frangible portions 78 and 90 could be a reduced thickness, as is shown with respect to retainer 62 in FIG. 4, a section having perforations or portions removed, or a section made of weaker material relative to that of the remainder of retainers 62, 64.

In at least one embodiment, the air bag guide 32 is effective to prohibit all contact between the deploying air bag 22 and the seat pad 16. This can help to prevent energy loss from the air bag 22 by decreasing friction and protecting the seat pad 16 from damage. This, in turn, can also help to reduce the deployment time for the air bag 22 and/or the amount of inflation fluid required to deploy the air bag.

In at least one embodiment, the inner and outer panels 34 and 36 of the air bag guide 32 form a deployment channel 38 for the air bag 22. As shown in FIGS. 2-4, the deployment channel 38 is oriented to facilitate deployment of the air bag 22 through the seam 28 in the trim cover 18.

Upon deployment of the air bag assembly 20, as shown schematically in FIG. 3, the deploying air bag 22 causes relative movement of the flexible inner and outer panels 34 and 36 away from each other which then provide a guiding function of the unfolding air bag 22 as it moves between the panels toward the air bag release seam 28 and eventually tears open the release seam for outward projection of the air bag to provide the occupant protection. Furthermore, as the air bag 22 deploys through the deployment channel 38, the air bag guide 32 acts as a blocking member that forms a barrier on two sides 39, 41 of the air bag 22, thereby inhibiting contact between the air bag 22 and the seat pad 16. Thus, the seat pad 16 is moved away from the air bag 22 as it deploys through the deployment channel 38.

As shown in FIGS. 3-4, the attachment of the outer extremities 52, 54 to opposed ends of the inner retainer 64 adjacent the seam 28 helps to facilitate deployment of the air bag 22 through the seam 28. This is because the deployment channel 38 opens as the air bag 22 is deployed, and this causes the inner retainer 64 to rupture at frangible portion 90. As the legs 86 and 88 of inner retainer 64 separate, they engage walls 80 causing the frangible portion 78 of outer retainer 62 to rupture adjacent the seam 28 directing the deploying air bag 22 to exert an outward force on the trim cover 18 at the seam 28; this helps to open the seam 28 to provide an easy exit for the air bag 22. Also, retainer assembly 50 helps to ensure that the air bag 22 will deploy in the predetermined desired manner through seam 28. Because of retainer assemblys 50 relatively consistent manufacturing process, use of retainer assembly 50 can help ensure relatively consistent deployment of air bag in seat assemblies 10 employing the use of retainer assembly 50.

As shown in FIG. 4, the seam 28 can be sewn, or otherwise attached, at locations 56, 58, where the legs 72, 74 of the outer retainer 62 are connected with end portions 31, 33 of the trim cover 18. This helps to transfer the force from the air bag guide 32, and facilitates separation of the seam 28. As shown in the embodiment illustrated in FIG. 4, the seam 28 can also be optionally sewn, or the ends of the cover be otherwise attached, at location 60.

Figure 5:
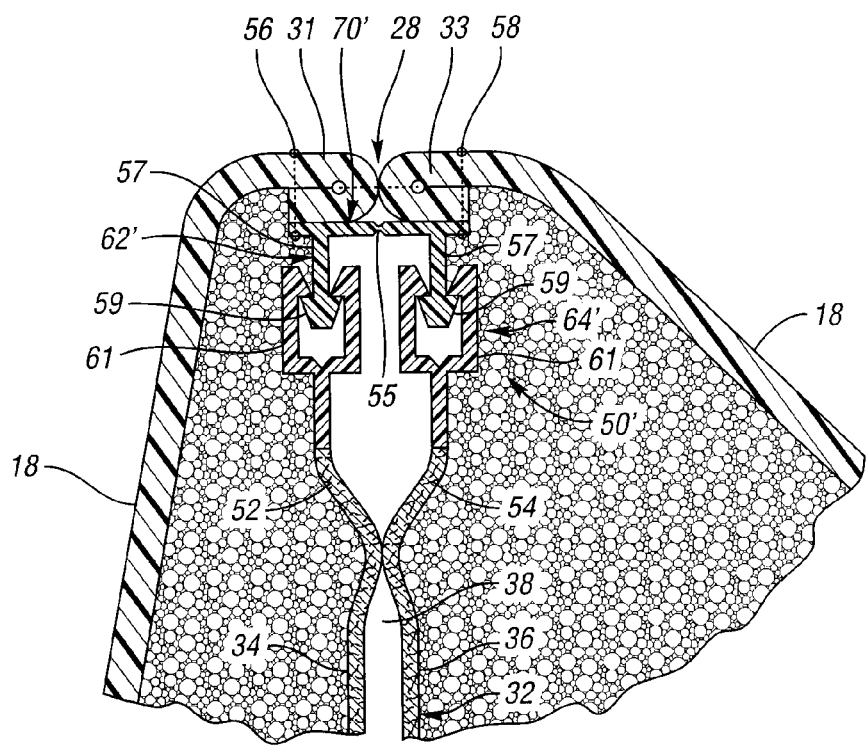
FIG. 5 is similar to FIG. 4 showing a different embodiment.

FIG. 5 illustrates a second embodiment of the retainer assembly 50'. The retainer assembly 50' is similar in construction and in operation to the retainer assembly 50 shown in FIG. 4. The outer retainer 62' is shown in the embodiment illustrated in FIG. 5 to have a base portion 70' connected to the first end portion 31 and second end portion 33 of trim cover 18. In the embodiment shown in FIG. 5, the base portion 70' has depending leg portions 57 having engagement portions 59 that depend from base portion 70' away from tear seam 28 towards the air bag guide 32. The base portion 70' in FIG. 5 also has a frangible portion 55 adjacent seam 28 that separates opposing leg portions of the base portion.

In the embodiment shown in FIG. 5, the inner retainer 64' has housing members 61 attached to panels 34, 36. The engagement portions 59 are insertable within housing members 61. The frangible portion 55 of the base portion 70', upon deployment of the air bag assembly 20, will rupture as the inner and outer panels 34 and 36 move relative to each other. This directs the air bag 22 towards the release seam 28 to eventually tear open the release seam so the air bag can project outward of the release seam 28 to provide occupant protection.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly, comprising:
a frame;
a seat pad adjacent the frame;

a trim cover extending over the seat pad and including a first and a second end portion forming a release seam adjacent the seat pad;

an air bag assembly mounted on the frame within the trim cover in a spaced relationship from the release seam, the air bag assembly including an inflator and a folded air bag that is inflated by the inflator to unfold and project outwardly from the seat through the release seam of the trim cover;

an air bag guide including an inner panel and an outer panel that are each made of flexible material and have outer extremities;

a first connector connected to the first and second end portions of the trim cover, the first connector being a unitary member further comprising a retainer portion for connection with the second connector and a frangible portion extending between and connecting the base portion and the retainer portion; and a second connector connected to the flexible inner and outer panels, the second connector comprising a unitary member comprising an inner portion, an outer portion, and a frangible portion extending between and connecting the inner and outer portions, each of the inner and outer portions of the second connector connecting to a respective one of the outer extremities of the flexible inner and outer panels.

2. The vehicle seat assembly of claim 1, wherein the second connector separates upon inflation of the air bag, the separation of the second connector causing the separation of the first connector which causes the separation of the release seam.

3. The vehicle seat assembly of claim 1, wherein the first connector comprises a base portion comprising a first leg connected to the first end portion of the trim cover and a second leg connected to the second end portion of the trim cover.

4. The vehicle seat assembly of claim 3, wherein stitching connects the first connector to the first and second end portions of the trim cover.

5. The vehicle seat assembly of claim 4, wherein the first connector is made of rigid plastic and the frangible portion separates upon inflation of the air bag.

6. The vehicle seat assembly of claim 5, wherein the second connector is made of rigid plastic.

7. A vehicle seat assembly, comprising:
a frame;
a seat pad adjacent the frame;
a trim cover extending over the seat pad and including a first and a second end portion forming a release seam adjacent the seat pad;
an air bag assembly within the trim cover in a spaced relationship from the release seam, the air bag assembly including an inflator and a folded air bag that is inflated by the inflator to unfold and project outwardly from the seat through the release seam of the trim cover;
an air bag guide including an inner panel and an outer panel having outer extremities;
a first connector extending between and connecting the first and second end portions of the trim cover; and
a second connector extending between and connecting the inner and outer panels to each other, the second connector extending between the first connector and the inner and outer panels, wherein the first and second connectors are made of rigid plastic.

8. The vehicle seat assembly of claim 7, wherein the second connector separates upon inflation of the air bag, the separation of the second connector causing the separation of the first connector which causes the separation of the release seam.

9. The vehicle seat assembly of claim 8, wherein the first connector comprises a base portion comprising a first leg connected to the first end portion of the trim cover and a second leg connected to the second end portion of the trim cover.

10. The vehicle seat assembly of claim 9, wherein stitching connects the first connector to the first and second end portions of the trim cover.

11. The vehicle seat assembly of claim 9, wherein the first connector is a unitary member further comprising a retainer portion for connection with the second connector and a frangible portion extending between and connecting the base portion and the retainer portion.

12. The vehicle seat assembly of claim 11, wherein the frangible portion separates upon inflation of the air bag.

13. The vehicle seat assembly of claim 12, wherein the second connector comprises a unitary member comprising an inner portion, an outer portion, and a frangible portion extending between and connecting the inner and outer portions, each of the inner and outer portions of the second connector connecting to a respective one of the outer extremities of the flexible inner and outer panels.

14. The vehicle seat assembly of claim 7, wherein the first connector has a base portion including a frangible portion and two depending legs having engagement portions on opposed sides of the frangible portion, and the second connector has two housing portions, with each of the housing portions engageable with a respective leg.

15. A vehicle seat assembly, comprising:
a frame;
a seat pad mounted on the frame;
a trim cover extending over the seat pad, the trim cover including a first end portion and a second end portion cooperating to form a release seam adjacent the seat pad;
an air bag assembly mounted on the frame within the trim, the air bag assembly including an inflator and an air bag that is inflated by the inflator to project outwardly from the seat through the release seam of the trim cover;
an air bag guide including a first panel and a second panel, each panel having outer extremities;
a first connector extending between and connecting the first and second end portions of the trim cover, the first connector comprising a base portion comprising a first leg connected to the first end portion of the trim cover and a second leg connected to the second end portion of the trim cover; and
a second connector extending between and connecting the first and second panels to each other, the second connector extending between the first connector and the first and second panels, wherein the second connector separates upon inflation of the air bag, the separation of the second connector causing the separation of the first connector which causes the separation of the release seam, wherein the first connector is a unitary member further comprising a retainer portion for connection with the second connector and a frangible portion extending between connecting the base portion and the retainer portion, wherein the frangible portion separates upon inflation of the air bag.

16. The vehicle seat assembly of claim 15, wherein stitching connects the first connector to the first and second end portions of the trim cover.

17. The vehicle seat assembly of claim 15, wherein the first and second connectors are made of rigid plastic.

18. The vehicle seat assembly of claim 17, wherein the second connector comprises a unitary member comprising an inner portion, an outer portion, and a frangible portion extending between and connecting the inner and outer portions, each of the inner and outer portions of the second connector connecting to a respective one of the outer extremities of the first and second panels.

19. The vehicle seat assembly of claim 15, wherein the first connector has a base portion including a frangible portion and two depending legs having engagement portions on opposed sides of the frangible portion, and the second connector has two housing portions, with each of the housing portions engageable with a respective leg.

\* \* \* \* \*